July 4, 1961           A. DI PRETE           2,991,442

ELECTRIC WIRING DEVICE

Filed Feb. 6, 1958

WITNESSES

INVENTOR
Andrew DiPrete
BY
ATTORNEY

United States Patent Office 2,991,442
Patented July 4, 1961

2,991,442
ELECTRIC WIRING DEVICE
Andrew Di Prete, Cranston, R.I., assignor to The Bryant Electric Company, Bridgeport, Conn., a corporation of Connecticut
Filed Feb. 6, 1958, Ser. No. 713,612
5 Claims. (Cl. 339—126)

The present invention relates generally to electric wiring devices and, more particularly, to means for securing a support plate thereto.

Electric wiring devices such as switches and outlet receptacles are generally provided with a housing of insulating material to contain the electrical conducting portions of the device and are also provided with a mounting plate for securing the device to a supporting structure such as a wall or an outlet box. Generally, the mounting plate is secured to the housing by additional securing means, such as screws or other fastening means, which not only require the provision of these additional securing means but considerable time to assemble the mounting plate to the housing as well. As can be appreciated, in the field of low cost wiring devices where large quantities of devices are produced, any saving in material, additional parts and in assembly time is quite necessary to produce a device competitive with other marketed devices.

The present invention, therefore, provides a low-cost assembly necessitating simplified assembly techniques and eliminating the need for additional fastening means for securing the mounting plate to the housing. The invention provides a mounting plate having a plurality of integral resilient mounting lugs therein whereby the plate is secured to the housing by merely fitting the mounting plate over the housing so that the lugs frictionally engage the sides of the housing to prevent motion of the mounting plate with respect to the housing.

Accordingly, it is an object of this invention to provide an electric wiring device having a housing and a mounting plate and having novel integral means for securing the mounting plate to the housing.

Another object of this invention is to provide an electric wiring device having a housing and a mounting plate and having integral mounting lugs on the mounting plate to secure the latter to the housing.

A third object of this invention is to provide an electric wiring device having a housing and a mounting plate whereby the mounting plate is secured to the housing merely by frictional engagement.

Still another object of this invention is to provide a wiring device having a two-part housing and a mounting plate and having interengaging means on the housing and the plate to prevent relative motion of these members when the parts of the housing are secured together.

Still another object of this invention is to provide an outlet receptacle having a mounting plate formed to provide front wiring of the receptacle and which mounting plate is constructed using a minimum of material.

These and other objects of this invention will become more apparent upon consideration of the following detailed description of a preferred embodiment thereof, when taken in conjunction with the attached drawings, in which.

Figure 1:
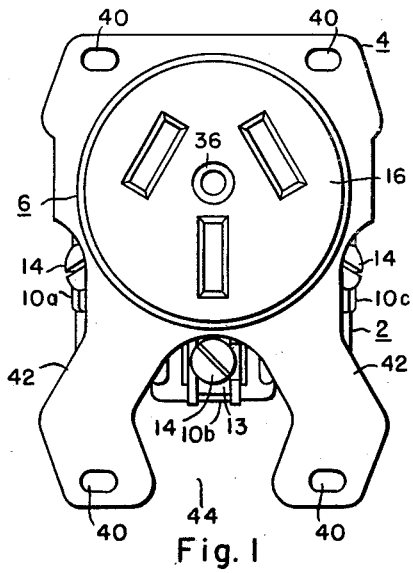
FIGURE 1 is a front plan view of a receptacle constructed in accordance with the principles of my invention.

Referring to FIGS. 1 to 4, it will be noted that a receptacle constructed in accordance with the provisions of this invention may comprise a base 2 which is enclosed by means of a cover 6 and has a yoke 4 located in part around the exterior sides of cover 6 and having a portion engaging the uppermost portion of base 2. Yoke 4 is formed from any suitable material having sufficient structural strength and resiliency, such as sheet steel, while base 2 and cover 6 are formed from any suitable insulating material, such as a molded insulating material which may be readily provided with the structure as hereinafter described.

The specific structure provided for base 2 does not form a part of this invention and any suitable structure may be utilized such as the base shown in Patent No. 2,782,388 of J. J. Opalenik and W. H. Bullis, entitled "Electric Range Outlet Receptacle," and assigned to the same assignee as the present invention. As illustrated in this patent, the base 2 may be provided with a generally rectangularly shaped plate portion 11 having an integral raised portion 8 which is essentially Y-shaped in plan and has a recess formed in each leg of the Y to provide a plurality of spaces for location of female contacts (not shown).

Since the present embodiment of the invention is a three-wire receptacle suitable for use with an electric range plug, the receptacle is provided with three female contacts and three wiring terminals 10a, 10b, 10c, in mechanical and electrical engagement with the contacts, respectively. The wiring terminals 10a, 10b and 10c may each comprise a generally U-shaped conductor receiving portion 12 having the bight portion or an extension thereof secured to the plate portion 11 of the base and having a lead wire engaging screw 14 engageable from the front of the receptacle and threadedly mounted in a cross bar portion 13, which is mounted in openings provided in the outer ends of the legs of the U-shaped portion 12 for sliding movement through these openings and laterally of the U-shaped portion 12 to and away from a position where it spans the legs of the U-shaped portion 12. For a more particular description of the structure and operation of this terminal structure, reference is again made to the Opalenik and Bullis patent hereinbefore mentioned. Generally, the terminals 10a and 10c differ from those shown by Opalenik and Bullis in that they extend angularly outwardly from the base plate 11 in divergent relation to further facilitate front engagement of screws 14 without interference from the yoke 4.

As shown, the cover 6 has a circular upper portion 16 which has an integral Y-shaped projection 18 extending downwardly from the under side of upper portion 16 and having arms 19a, 19b and 19c. The outer end of the arms of the Y-shaped portion 18 are all spaced inwardly of the outer edge of upper circular portion 16, and the arms are formed to be in essentially vertical alignment with the arms of Y-shaped raised portion 8 on the base so that an essentially unitary Y-shaped housing is formed when the cover 6 is placed on the raised portion 8 of base 2. In order that the yoke 4 can engage the under surface of the upper portion 16 of the cover 6, it is provided with a generally hexagonally-shaped opening 20 of a size so that the Y-shaped projection 18 of the cover 6 is closely received therein and so that the upper surface of the yoke 4 adjacent the opening 20 engages the under surface of the upper circular portion 16 of the cover. Around the periphery of the opening 20, there are provided two resilient lugs 22 and a base engaging lug 24. The lugs 22 extend downwardly from the under side of yoke 4 at an acute angle and are adapted to frictionally engage portions of the sides of two adjacent arms of cover projection 18 and also to bias projection 18 into engagement with the base engaging lug 24. The base engaging lug 24 extends in essentially the same direction as lugs 22 at nearly a right angle but preferably inclined slightly towards the lugs 22 so that the lug 24 engages the aligned surfaces 26 at one side of projection 18 when the receptacle is assembled.

In order to secure the yoke 4 to cover 6, the projection 18 is passed downwardly into the hexagonal opening 20 so that base engaging lug 24 is bridged across adjacent arms 19a and 19c of the projection 18, and portions 27 thereof frictionally engage the surfaces 26 of each of the arms 19a and 19c, and one of the lugs 22 has opposite outer corners engaging a portion of the adjacent surfaces of arms 19b and 19c, and the other projection 22 engages a similar portion of the adjacent surfaces of arms 19a and 19b. Since the initial spacing between lugs 22 and 24 is less than the corresponding dimensions of the cover projection 18, the lug 24 will be biased into engagement with surfaces 26 of projection 18, and also the projection 18 will be biased into engagement with lugs 22. When the upper surface of yoke 4 is flush with the under side of the circular upper portion 16 of cover 6, it is to be noted that portions 27 of base engaging lug 24 are constructed to extend slightly beyond the back surface of the projection 18 to facilitate the mounting of yoke 4 as will hereinafter be more fully described. It is also to be noted that the surfaces 26 of arms 19a and 19c are formed by flattening adjacent corners of arms 19a and 19c of the cover projection 18 for purposes to be described later in the description.

As pointed out, portions 27 of base engaging lug 24 engage the surfaces 26, respectively, and a central portion 28 of base engaging lug 24 located between portions 27 extends downwardly therefrom and, upon assembly of the receptacle, is located in a gap between adjacent corners 30 of raised portion 8.

As previously pointed out, the raised portion 8 of base 2 and projection 18 of cover 6 are similarly shaped and sized so that their outer surfaces are aligned when the base is secured to the cover. It is to be noted, however, that corners 30 on raised portion 8 are essentially aligned with surfaces 26 on cover projection 18. The corners 30, however, are not flattened as are surfaces 26 so that they project outwardly therefrom forming shoulders 29 on one side of the housing when base 2 is assembled to cover 6.

As has been indicated above, the base 2 may be substantially identical with the base shown in the Opalenik and Bullis patent, and accordingly, the contacts and terminals of the receptacle may be located on the base in a manner similar to that described and shown in that patent. The cover 6 is, therefore, provided with recesses 32 in each of its arms 19a, 19b and 19c to receive a portion of the female contacts of the terminals therein. Openings 34 extend from the front face of the circular upper portion 16 into the recesses 32, respectively, to provide for the insertion of male contacts of a conventional plug used with this receptacle.

The cover 6 is also provided with a centrally located opening 36 extending therethrough and the base 2 is provided with an aligned similar opening (not shown) to facilitate the securing of the base 2 to cover 6. In order to utilize a standard rivet or bolt in securing the base to the cover, the opening 36 is constructed to have a larger diameter at the front face of cover 6 and, similarly, the opening in base 2 is provided with a portion of larger diameter at the back surface thereof.

Figure 3:
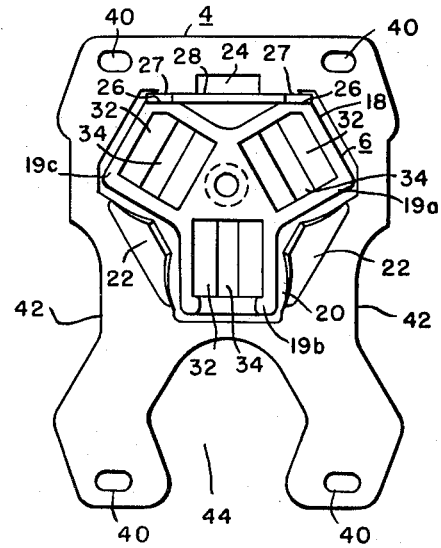
FIG. 3 is a bottom view of the receptacle shown in FIG. 1 and having portions thereof removed.

The yoke 4 is provided with mounting holes 40 located in each corner thereof to facilitate its mounting on a suitable support by conventional means, such for example as screws. Referring specifically to FIGS. 1 and 3, it is to be noted that opposite sides of yoke 4 are provided with inwardly extending portions 42 to facilitate access to the screws of wiring terminals 10a and 10c, respectively, from the front of the receptacle. The lower edge of yoke 4 is formed with a cut-away portion 44 to permit front access to the screw 14 of wiring terminal 10b. It is, therefore, seen that the yoke is constructed of a minimum of material which results in a cost saving in producing this member as well as permits ease of front access to each of the wiring terminals 10a, 10b and 10c.

In order to assemble the receptacle, it is first necessary to secure the yoke 4 to cover 6. This is accomplished by passing the Y-shaped cover projection 18 through yoke opening 20 until the under side of cover portion 16 is flush with the front face of yoke 4. When the yoke 4 and cover 6 are in this assembled relationship, motion of the yoke along the sides of the cover projection 18 is prevented in one direction by the circular upper portion 16 and is prevented in the opposite direction by a biting action of lugs 22 of yoke 4 into the sides of projection 18. Inasmuch as lugs 22 are extended at an acute angle from yoke 4 to frictionally engage the sides of projection 18, lugs 22 are essentially cantiliver arms, the corners of which bite into the relatively soft cover material and thereby resist such motion. The base engaging lug 24 which also extends angularly from yoke 4 does not extend therefrom at a right angle but rather extends at an acute angle slightly less than 90°. Thusly, base engaging lug 24 acts as a resilient member when the cover is passed through yoke opening 20 and is biased into frictional engagement with the surfaces 26 of projection 18 to additionally cooperate with lugs 22 to prevent motion of yoke 4 away from the under side of upper portion 16. Since lug 24 is a flat member and engages both the arms 19a and 19c of projection 18, it cooperates with lugs 22 to prevent rotation of the yoke 4 with respect to cover 6 about an axis perpendicular to the plane of the yoke.

The wiring terminals 10a, 10b and 10c and the female contacts of the receptacles are secured to base 2 in a conventional manner such as the manner described in the Opalenik and Bullis patent. The base 2 is then secured to cover 6 by aligning the raised portion 8 of the base with projection 18 of the cover and by then passing suitable securing means through the aligned openings 36 in the base 2 and cover 6. Inasmuch as portions 27 of base engagaing lug 24 extend slightly beyond projection 18 of cover 6, the portions 27 engage shoulder 29 on the raised portion 8 of the base. The engagement of portions 27 with the shoulders 29 acts to bias the front face of the yoke into engagement with the under side of cover portion 16, and accordingly, yoke 4 is non-movably secured to the housing of the receptacle.

Figure 2:
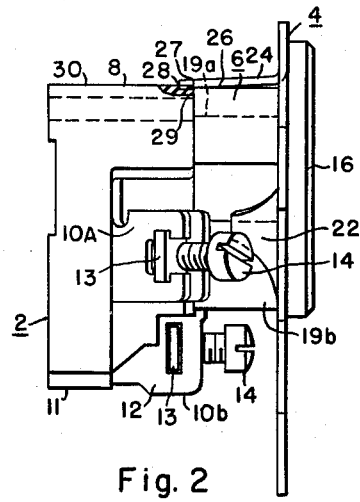
FIG. 2 is a side elevation view of the receptacle shown in FIG. 1 and having a portion thereof cut away to clarify the operation of this invention.
Figure 4:
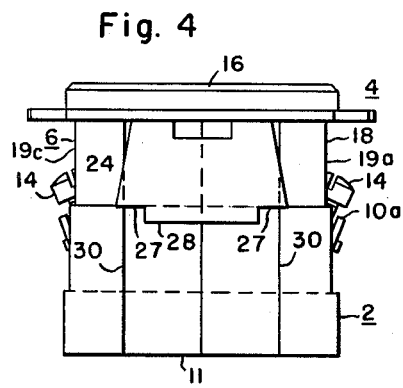
FIG. 4 is an end elevation view of the receptacle shown in FIG. 1.

As shown in FIG. 2, it is to be noted that the portion 28 of base engaging lug 24 is located in the gap between corners 30 of raised portion 8. Accordingly, rotative motion of base 2 and cover 6 about an axis perpendicular to the plane of yoke 4 is limited thereby.

From the foregoing description, it is apparent that this invention provides a novel means for mounting a yoke to a receptacle by merely providing integral portions on yoke 4 which cooperate with cover 6 and base 2 of the receptacle to provide for non-movably securing yoke 4 to the receptacle and which also cooperates in a novel manner with base 2 and cover 6 to prevent relative motion of the latter members. Additionally, this invention provides for cooperation of the yoke 4 with terminal screws 14 whereby wiring of the receptacle from the front of yoke 4 is possible.

Since numerous changes in the above-described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. A wiring device comprising a support plate having an opening therethrough, a cover member of insulating material having a shoulder in engagement with one side of said plate and a non-circular hollow projection thereon located in said opening, a base member of insulating material having a portion thereof in engagement with the outer end of said projection and having a shoulder extending outwardly from one side of said projection, resilient cantilever lugs located on the periphery of said opening and biased into engagement with portions of the sides of said projection, another integral lug located on the periphery of said opening and extending to abut said shoulder of said base member to provide flush engagement of said support plate with said cover shoulder, contacts mounted in said projection, openings in said cover member in alignment with said contacts respectively, and means for securing the cover member and base member together whereby said support plate is non-movably mounted on said cover member.

2. A wiring device comprising a support plate having an opening therein, a cover member of insulating material having a shoulder in engagement with one side of said plate and a hollow projection located in said opening, a base member of insulating material having a surface thereon in engagement with the end of said projection and having at least one portion thereof extending outwardly from at least one side of said projection; a resilient integral lug located on the periphery of said opening engaging one side of said projection and biasing another side thereof into engagement with a portion of the periphery of said opening, said lug engaging said portion of said base surface to bias said plate into flush engagement with said cover shoulder, contacts located in said projection, openings in said cover in alignment with said contacts, respectively, and means to secure said base and cover members together.

3. A wiring device comprising a support plate having an opening therein, a cover member of insulating material having a shoulder in engagement with one side of said plate and having a hollow projection located in said opening, a base member of insulating material having a concave side and having a surface thereon in engagement with the end of said projection and having at least one portion thereof extending outwardly from at least one side of said projection; a resilient integral lug located on the periphery of said opening engaging one side of said projection and biasing another side thereof into engagement with a portion of the periphery of said opening, said lug engaging said portion of said base surface to bias said plate into flush engagement with said cover shoulder, said lug having a portion thereon located in said concave side of said base member and having edges thereon in engagement with said concave side to prevent rotative motion of said base and said cover about an axis perpendicular to the plane of said plate, contacts located in said projection, openings in said cover in alignment with said contacts, respectively, and means to secure said base and cover members together.

4. An electrical receptacle comprising a support plate having an opening therein, a cover of insulating material having a shoulder in engagement with one side of said plate and having a hollow, Y-shaped projection extending from said shoulder into said opening, a base of insulating material having a portion thereof provided with a Y-shaped cross section and having a surface on said portion in engagement with the outer end of said projection, said surface having a section thereof extending outwardly from the sides of first and second arms of said projection, an integral cantilever lug extending from the periphery of said opening at an acute angle and biased into engagement with the concave portion of the side of said projection formed by a third arm and said first arm thereof, another integral cantilever lug extending from the periphery of said opening at an acute angle and biased into engagement with the concave portion of the side of said projection formed by said second and third arms thereof, whereby relative rotary motion of said plate and said cover about the axis perpendicular to the plane of said plate is prevented, an integral third lug extending from the periphery of said opening to abut said surface sections of said portion of said base member to provide flush engagement of said plate with said shoulder of said cover, contacts mounted in said projection, openings in said cover aligned with said contacts and means for securing said base to said cover.

5. An electrical receptacle comprising a support plate having an opening therein, a cover of insulating material having a shoulder in engagement with one side of said plate and having a hollow, Y-shaped projection extending from said shoulder into said opening, a base of insulating material having a portion thereof provided with a Y-shaped cross section and having a surface on said portion in engagement with the outer end of said projection, said surface having a section thereof extending outwardly from the sides of first and second arms of said projection, an integral cantilever lug extending from the periphery of said opening at an acute angle and biased into engagement with the concave portion of the side of said projection formed by a third arm and said first arm thereof, another integral cantilever lug extending from the periphery of said opening at an acute angle and biased into engagement with the concave portion of the side of said projection formed by said second and third arms thereof, whereby relative rotary motion of said plate and said cover about the axis perpendicular to the plane of said plate is prevented, an integral third lug extending from the periphery of said opening to abut said sections of said portion of said base member to provide flush engagement of said plate with said shoulder of said cover, said third lug having a portion located in the concave portion of the side of said Y-shaped base portion formed by two adjacent arms and having edges thereon adapted to engage said arms upon attempted rotation of said base with respect to said cover about said axis to prevent such relative movement, contacts mounted in said projection, openings in said cover aligned with said contacts and means for securing said base to said cover.

References Cited in the file of this patent
UNITED STATES PATENTS

| Number | Name | Date |
| --- | --- | --- |
| 913,024 | Meacham | Feb. 23, 1909 |
| 1,651,554 | Sachs | Dec. 6, 1927 |
| 1,982,263 | Muldoon | Nov. 27, 1934 |
| 2,214,065 | Pennock et al. | Sept. 10, 1940 |
| 2,495,838 | Deakin | Jan. 31, 1950 |
| 2,588,558 | Mosimann | Mar. 11, 1952 |
| 2,817,826 | O'Mara | Dec. 24, 1957 |